Patented Sept. 11, 1945

2,384,446

UNITED STATES PATENT OFFICE 2,384,446

NEUTRALIZING CRUDE NITROGUANIDINE

Kenneth D. Ashley, Noroton, Conn., assignor to American Cyanamid Company, New York, N. Y., a corporation of Maine No Drawing. Application May 22, 1944, Serial No. 536,815

2 Claims. (Cl. 260—564)

The present invention relates to the production of nitroguanidine of a grade suitable for use as or with explosives, and is particularly concerned with a method of preparing the same under such conditions as to produce a neutral or non-acid product.

Nitroguanidine may be prepared by a number of methods. One such method consists in first preparing guanidine nitrate by fusion of ammonium nitrate and dicyandiamide with subsequent conversion of the guanidine nitrate into nitroguanidine by means of concentrated sulfuric acid. While we are not particularly concerned with the method of preparation of nitroguanidine per se, yet the fact remains that all practical methods for its production involve the use of concentrated sulfuric acid to remove one molecule of water from the guanidine nitrate in converting the latter into nitroguanidine. Consequently all practical methods end up with a concentrated sulfuric acid solution of nitroguanidine.

Crystalline nitroguanidine is obtained from this acid mixture by drowning in a large quantity of cold water. Due to the extreme insolubility of nitroguanidine in cold water, the former is precipitated as very fine crystals.

The thus obtained crystals present a serious problem from the standpoint of meeting the rigid specifications set up by explosives manufacturers. The most serious of these difficulties is perhaps the fact that it is extremely difficult to recover the nitroguanidine completely free from sulfuric acid. The presence of even a small quantity of this acid causes storage difficulties as well as undue corrosion in the ordnance pieces with which the mixture containing nitroguanidine are used.

Many attempts have been made to accomplish this desirable end through recrystallization. Inasmuch, however, as at ordinary temperatures nitroguanidine is substantially insoluble in water, recrystallization from this medium involves the handling of huge volumes of material, making necessary expensive tanks, pumping equipment, filters and the like.

It has also been proposed to effect recrystallization and consequent removal of residual sulfuric acid through the use of water at higher temperatures obtained through pressure. For instance, it is stated that at 158° C., 100 parts of water will dissolve 965 parts of nitroguanidine. This being true, it then only becomes necessary to discharge an aqueous solution of nitroguanidine at that temperature and requisite pressure into cold water to recrystallize the nitroguanidine. In order, however, to completely free the nitroguanidine crystals from residual sulfuric acid, a number of such crystallizations are required. Again this involves expensive pressure equipment and much re-handling of material.

In the production of nitroguanidine crystals and in the study of the various phenomena accompanying the same, it has been noted that residual sulfuric acid occurs in two places with relation to the crystal itself. First, a minor amount of the free acid remains clinging to the surface of the crystal; but perhaps the larger part of the residual acid is occluded in the lightly bound crystal clusters which have a tendency to aggregate together during the drying operation. Consequently, unless repeated washings and recrystallizations are resorted to, it is difficult, if not impossible, to finally reach this occluded acid for removal.

It has now been discovered that if an appropriate neutralizing agent is thoroughly mixed with the nitroguanidine crystals prior to the drying operation during the final water removal step at comparatively low temperatures, not only is the surface acid neutralized, but the normal acidity developing during the drying procedure is eliminated; for it is at this stage that the occluded or residual acid becomes available for neutralization.

The invention, therefore, in one of its broad aspects contemplates the neutralization of residual acid from a crystalline nitroguanidine.

Not all types of neutralizing agents are usable inasmuch as nitroguanidine for use as or with explosives must adhere to very rigid specifications. These specifications are necessarily rigid because nitroguanidine is readily susceptible to decomposition under certain conditions. Perhaps that most favorable to chemical breakdown is alkalinity. Nitroguanidine begins to decompose slightly at a pH of 7.1 and at 7.6 decomposition is rapid. Conditions must, therefore, be maintained so that under no circumstances is a pH of 7.5 exceeded. Preferably the pH should be maintained no higher than 6.5. A safe and very desirable limit is from 5.0 to 6.5.

For this reason not all neutralization agents may be used. As above indicated all free acid should be neutralized, yet alkalinity must also be controlled.

In any neutralization reaction, it is known that the last trace of acid is slow to respond. This is particularly true where a slurry is involved and more so under the present conditions where the last acid to be neutralized is that occluded in the crystal masses or clusters. Therefore, even if the theoretical amount of alkali is initially contacted with the wet nitroguanidine crystal, neutralization of the surface acid does not use up all the alkali. Until the occluded acid can be reached by the neutralization agent, the surface of the nitroguanidine crystals will contact unreacted neutralization agent.

As there is some water present right up to the point of eventual dryness, if the agent is sufficiently water soluble, a pH in the nitroguanidine decomposition range is bound to result. This effect, is, of course, more apt to occur where the quantity of neutralization agent needed is not gauged accurately and an amount used in excess of that required.

This means therefore, that the choice of neutralization agents must be restricted to those, the presence of which will, in any event, fail to raise the pH of the nitroguanidine to 7.6 and will preferably maintain a pH of from 5.0 to 6.5.

A certain group of neutralizing agents have been found admirably adaptable for this purpose as their relative water insolubility and mild alkalinity assures the maintenance of a desired pH within a nitroguanidine nondecomposition range. These materials are the carbonates and the hydroxides of the alkaline earth metals and cadmium which have a water solubility no greater than .065 gram at 100° C. The water solubility of these compounds is as follows:

| Neutralization agent | Water solubility |
|---|---|
| $CaCO_3$ | .002 at 100°, .0012 at 20°. |
| $BaCO_3$ | .0065 at 100°, .0022 at 18°. |
| $SrCO_3$ | .065 at 100°, .0011 at 18°. |
| $Cd(OH)_2$ | 0 at 100°, .00026 at 25°. |
| $CdCO_3$ | 0 at 100°, 0. |

Other neutralization agents having a greater water solubility than $SrCO_3$ are unsuitable because they raise the pH of the nitroguanidine to undesirable highs as above described. Typical of agents unsatisfactory because of this reason are $Sr(OH)_2$ and $Ba(OH)_2$ which have the following solubilities:

| Neutralization agent | Water solubility |
|---|---|
| $Sr(OH)_2$ | 21.83 at 100°, .41 at 0°. |
| $Ca(OH)_2$ | .077 at 100°, .185 at 0°. |
| $Ba(OH)_2$ | 101.4 at 80°, 4.29 at 25°. |

$Ca(OH)_2$ could not be used even if its water solubility were less than above indicated because of its too great alkalinity, nor can any neutralization agent be used which has the alkalinity of $Ca(OH)_2$.

A preferred method of accomplishing the purpose of the invention is to take a water washed wet sample of the filtered nitroguanidine crystals, dissolve the same in boiling water and titrate against alkali to determine acidity. This figure will then indicate the amount of equivalent alkali required to completely neutralize the residual acid. This amount, of course, is not a fixed one, but will be determined by the particular case in hand and will depend upon the degree of washing and/or recrystallization to which the nitroguanidine as been subjected up to the point where it is ready for final drying.

A suitable treatment is to mix or slurry the moist nitroguanidine crystals with the calculated or slight excess quantity of the water insoluble neutralization agent chosen from the above specified group. After the slurry has been made, it will require subsequent water removal which can be conveniently accomplished by pressure filtering, although this is not necessary as a simple mixing of the moist filter cake prior to oven or open-air drying is entirely satisfactory.

Mixing of the neutralization agent with the nitroguanidine crystals results in a metathetical neutralization of the surface sulfuric acid. During the drying operation the occluded or otherwise loosely held acid occurring within the crystal aggregates or crystal clusters becomes available for reaction with the insoluble neutralization agent. As a result, no difficulty whatever is experienced in ending up with a dry product falling within the required specifications which, as to acidity, is normally a pH between 5 and 7.5 even though a slight excess of alkali were used. The very small amounts of either the sulfates of the metals of the neutralization agents or the agents themselves are not detrimental to the uses to which the nitroguanidine is normally put or from a pH standpoint.

The final aggregates of crystals are only very loosely bound together and may be readily separated without resort to explosive or dangerous grinding or attrition.

While the invention has been described with particular reference to specific conditions, yet it is to be understood that the invention is not to be limited thereto, but is to be construed broadly and restricted solely by the scope of the appended claims.

What is claimed:

1. A method of neutralizing residual sulfuric acid in crystalline nitroguanidine resulting from its method of manufacture which includes contacting the nitroguanidine crystals with a compound chosen from the group consisting of calcium carbonate, barium carbonate, strontium carbonate, cadmium carbonate, and cadmium hydroxide.

2. A method of neutralizing residual sulfuric acid in crystalline nitroguanidine resulting from its method of manufacture which includes contacting the nitroguanidine crystals with cadmium hydroxide.

KENNETH D. ASHLEY.